Patented June 10, 1930

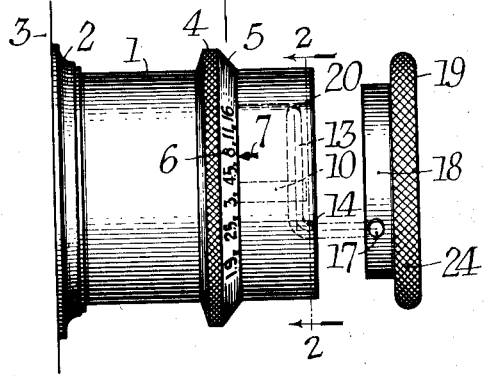

1,762,938

UNITED STATES PATENT OFFICE

DONALD H. STEWART, OF ROCHESTER, NEW YORK, ASSIGNOR TO EASTMAN KODAK COMPANY, OF ROCHESTER, NEW YORK, A CORPORATION OF NEW YORK

OPTICAL EQUIPMENT FOR PHOTOGRAPHIC CAMERAS

Application filed October 24, 1928. Serial No. 314,781.

This invention relates to photography, and more particularly to optical equipment for photographic cameras. One object of my invention is to provide a cooperating objective and filter mount arranged so that, in placing the filter mount upon the objective, the diaphragm will be adjusted to a predetermined position. Another object of my invention is to provide a filter mount which may be placed on an objective when the diaphragm is in any position and then, by properly seating the filter mount, the diaphragm will be automatically moved to a predetermined setting. Another object of my invention is to provide a filter mount especially suited for color photography with a banded filter which is slidably mounted on an objective and which sliding movement is arranged to move a diaphragm in the objective to a predetermined position as the filter bands are positioned. Another object is to provide an objective with a device for locating a banded filter by sliding the filter mount and to provide a means actuated by this sliding movement for adjusting the objective diaphragm, and other objects will appear from the following specification, the novel points being particularly pointed out in the claims at the end thereof.

In certain systems of natural color photography, filters employing a plurality of different color bands are employed in connection with film having a series of minute lenticular elements. It is necessary to position the banded filter definitely in a predetermined position with respect to the film, and in order to obtain sufficient light for making photographs through the multicolor filter, a wider aperture lens must be used with the diaphragm also open wide. My present invention is directed particularly to a means for automatically setting the diaphragm as the banded filter is placed on the camera objective, thus eliminating the usual step of first setting the diaphragm and then afterwards placing the filter on the objective.

Coming now to the drawings wherein like reference characters denote like parts throughout,—

Fig. 1 is a side elevation of an objective and a filter mount constructed in accordance with and embodying a preferred form of my invention.

Fig. 2 is a section of line 2—2 of Fig. 1.

Fig. 3 is a front elevation of the banded filter carried by the filter mount shown in Fig. 1.

Fig. 4 is a section through a typical iris diaphragm which may be used in the lens mount shown in Fig. 1.

Fig. 5 is a preferred type of snap latch adapted to position and latch the filter mount in a correct position with respect to the objective.

Fig. 6 is a side elevation of an objective and filter constructed in accordance with a second embodiment of my invention.

Fig. 7 is a side elevation of the filter holder shown in Fig. 6.

Fig. 8 is a front elevation of the banded filter in the filter mount mounted on the objective shown in Fig. 6.

Fig. 9 is a fragmentary perspective view showing portions of a motion picture camera equipped with an objective and fully constructed in accordance with my invention.

As shown in Fig. 1, a preferred embodiment of my invention may comprise a lens tube 1 which may be mounted by means of a flange 2 upon a suitable wall 3 of a camera. The mount is preferably provided with an adjustable ring 4 having a bevelled face 5 bearing a diaphragm scale 6, a pointer 7 engraved on the barrel indicating the position of the diaphragm leaves.

The parts thus far described constitute a camera objective when equipped with lens elements of suitable type. Since the type of lens elements are not important to the present invention, they are not shown or described.

The diaphragm in the objective 1 may comprise a relatively fixed annular member 8 and a movable annular member 9, this last mentioned annular member being provided with an extension 10. Between these two annular members are a series of arcuate diaphragm leaves 11 which are pivotally mounted to members 8 and 9, so that, by moving member 9, the opening 12 existing between the leaves may be altered at will. The annular member 9 may be provided with a pin extending through a slot in member 1 and engaged by the adjusting member 4.

The diaphragm opening 12 can be adjusted by the knurled ring 4 in the usual manner. In accordance with my invention, however, a second provision is made for adjusting the movable diaphragm ring 9. The arm 10 from the movable diaphragm ring 9, as shown in Fig. 1, extends across a slot 13 which is cut in tubular member 14ª which lies inside of a tubular member 15 which constitutes the outside wall of the lens mount 1, through to the edge of the tube 14 as indicated at 16.

The slot just described and a pin 17 on flange 18 of a filter mount 19 constitute a type of a bayonet latch by which the filter mount may be positioned on the objective.

As will appear from Fig. 1, when the filter mount is mounted upon the objective by entering pin 17 in slot 14 and then sliding the filter mount with respect to the lens mount, so that pin 17 will ride down slot 13, the arm 10 will be likewise moved by the pin 17.

The parts are so proportioned that when the pin 17 comes to rest in the end 20 of slot 13, the diaphragm opening 12 will be positioned at "f" 1.9 or fully open with the objective shown in the drawings. Obviously, if some other lens aperture is desired, the length of slot 13 may be correspondingly altered.

It will also be seen that, regardless of the initial setting of the diaphragm ring 4, the pin 17 will engage and move lever 10 to the end of the slot. It is only when the diaphragm is fully open that the lever 10 will not be engaged in sliding the finger mount on the objective.

Referring now to Fig. 5, the annular member 14ª may be equipped with a slot 13 as above described, this slot having an exit 14. In order to firmly hold and latch the filter holder 19 in such a position that the filter bands Fr, Fg, Fb, are properly located with respect to film positioned in a camera in the usual manner, I prefer to provide a snap latch for holding the pin 17 in a predetermined position.

This snap latch may be readily formed from the middle of tubular member 14ª by providing a slot 22, leaving a spring finger 23 which slightly restricts the width of slot 13. By sliding the filter mount 19, the pin 17 is snapped past the end of this spring finger and is firmly latched in position. A sharp turn in the reverse direction releases the pin from the spring finger 23 and permits the filter holder to be removed. For convenience in operating the filter holder, I prefer to knurl the edge, as indicated at 24.

While the above described embodiment of my invention is more compact, in some cases it may not be possible to slidably mount the filter carrier on the objective by engaging a flange on the filter carrier with the inside of a lens barrel. If such is the case, the construction shown in Figs. 6 to 8 inclusive may be employed. Here a lens barrel 50 may be provided with a diaphragm scale 51 and a lever 52 having a finger grip 53 by which the diaphragm may be adjusted. Lever 52 may pass through a slot 54 in the lens barrel and may be fastened to a movable diaphragm member, such as member 9 shown in Fig. 4. In order to engage and automatically position the lever 52, I provide a cam 55 carried by a flange 56 of a filter holder 57. This flange has a straight lower edge 58 which may engage a pin 59 on the lens barrel 50. By grasping the knurled edge 60 and thrusting the cam 55 between the pin 59 and the diaphragm adjusting lever 52, the filter holder may be slid into position on the objective, and during this sliding movement the diaphragm adjusting lever 52 will be cammed to a position in which the diaphragm is opened sufficiently for use with the banded filter.

While it is possible to provide a filter holder which will work satisfactorily with only a single cam 55, as above described, I prefer to provide a pair of pins 59 and 61 on the lens mount 50, one on each side of the mount. With such construction, the flange 56 of the filter mount 57 may be provided both with a cam 55 and an arm 62 slotted at 63. This greatly facilitates placing the filter mount on the objective, since pin 61 is engaged by the slot 63 and pin 59 by the straight edge 58 of cam 55.

As will be seen from the above described embodiment of my invention, the filter mount may be slid upon the lens mount and this sliding movement, whether a turning movement or a movement axially of the objective, causes the diaphragm to be adjusted to the proper opening for the filter carried by the filter mount. It is unnecessary for the user to adjust the diaphragm and then place the filter in position so that operations necessary for taking color pictures are reduced to a minimum.

In Fig. 9 I have shown a fragmentary view of a camera equipped with an objective and filter mount constructed in accordance with my invention. The film F is provided with a plurality of very fine lenticular elements L and may be moved down through a gate 70 which may be of any usual type and is here shown as being connected by the bent plate 71 terminating in a flange 72 to a support.

In the present instance, the support may be the front wall 73 of the camera.

As the objective 1 is likewise attached to the support 73, the objective and the film gate are both fixed with respect to each other. The objective is provided with a ring 4 for adjusting the diaphragm and this ring may bear a point 78, which, by means of the scale 77 indicates the "f" value of the diaphragm opening.

The objective 1 is, like the embodiment of my invention, described with reference to Figs. 1 and 2. That is, there is a slot opening 14 into which a pin 17 may be inserted in placing the mount 24, bearing the banded multicolor filter. By sliding the mount into place, the diaphragm opening may be properly positioned with the color bands $Fr$, $Fg$, $Fb$ in a fixed position with respect to the film gate 70 and, consequently, in a fixed position with reference to the lenticular elements L.

With the different embodiments of my invention above described, it will be seen that by sliding the filter mount until it is brought to a stop, thus positioning the filter bands, the objective diaphragm will also be moved to the proper "f" opening, and, as the objective and the film gate are fixed with respect to a main support, the filter is likewise brought to a fixed position with respect to the film gate.

Having thus described my invention, what I claim as new and desire to secure by Letters Patent is:

1. In an optical equipment for cameras, the combination with an objective and a mount therefor, of a diaphragm therefor including a movable member for adjusting the diaphragm opening, a filter holder adapted to slide upon the objective mount, and co-operating means on the diaphragm adjusting mechanism and the filter holder operative to move the mechanism and adjust the diaphragm when the holder is slid upon the objective mount.

2. In an optical equipment for cameras, the combination with an objective and a mount therefor, of a diaphragm therefor including a movable plate adapted to adjust the diaphragm opening and extending from the diaphragm, a filter holder adapted to slide upon the objective mount and means carried by the filter holder adapted to engage a part of the diaphragm adjusting plate whereby said plate may be moved by said filter holder in sliding said holder on said objective.

3. In an optical equipment for cameras, the combination with an objective and a mount therefor, of a diaphragm therefor including a movable member for adjusting the diaphragm opening, a filter holder adapted to slide upon the objective mount, and co-operating means on the diaphragm adjusting mechanism and the filter holder operative to move the mechanism and adjust the diaphragm when the holder is slid upon the objective mount, said means also locating the filter in a definite predetermined position with respect to the objective.

4. In optical equipment for photography, the combination with an objective and a mount therefor, of a diaphragm for the objective including a movable member by which the diaphragm may be adjusted, a filter holder adapted to be carried by the objective mount and to be seated thereon in a predetermined position, and means actuated by seating said filter holder in said predetermined position for engaging the movable diaphragm adjusting member to set the diaphragm to a predetermined setting.

5. In optical equipment for photography, the combination with an objective and a mount therefor, of a diaphragm for the objective including a movable member by which the diaphragm may be adjusted, a filter holder adapted to be carried by the objective mount and to be seated thereon by moving said filter holder relative to the objective into a predetermined position thereon, and means carried by the filter for engaging and moving the diaphragm adjusting member as the filter holder is moved onto the objective to its predetermined position.

6. In an optical equipment for cameras, the combination with an objective and a mount therefor, of an adjustable diaphragm therefor including a movable element by which the diaphragm opening may be altered, means carried by the objective for locating a filter thereon, a filter mount adapted to be slid into position defined by the filter locating means, and cooperating parts on the movable element and the filter mount adapted to move said element to adjust said diaphragm by sliding said filter holder on the objective.

7. In an optical equipment for cameras, the combination with an objective and a mount therefor, of an adjustable diaphragm therefor including a movable element by which the diaphragm opening may be altered, means carried by the objective for locating a filter thereon, a filter holder adapted to be slid into position on the objective, a latch adapted to hold said filter holder in the position defined by the means carried by the objective, said diaphragm operating element being adapted to extend into the path of a filter holder slid on the objective whereby said diaphragm may be automatically adjusted by sliding said filter holder until it latches in position on said objective.

8. In optical equipment for cameras, the combination with an objective, of a movable diaphragm therefor, a slotted mount for the objective, a diaphragm adjusting member adapted to extend across the slot, a filter holder adapted to be guided by said slot by moving the filter holder relative to the objective, said filter being guided by the slot into position on the objective being adapted to engage and move the diaphragm adjusting member lying across the slot.

9. In optical equipment for cameras, the combination with an objective, of a movable diaphragm therefor, a slotted mount for the objective, a diaphragm adjusting member adapted to extend across the slot, a filter holder, a pin carried by the filter holder for engaging the slot, whereby said diaphragm may be adjusted through the diaphragm adjusting member and the pin as the filter is guided into position on the objective mount.

10. In optical equipment for cameras, the combination with an objective, of a movable diaphragm therefor, a slotted mount for the objective, a diaphragm adjusting member adapted to extend across the slot, a snap latch at the end of the slot, a pin carried by the filter holder for engaging the slot, whereby said diaphragm may be adjusted through the diaphragm adjusting member and the pin as the filter is guided into position on the objective mount, in which said pin is engaged by said snap latch.

11. In an optical equipment for cameras the combination with an objective, a mount for the objective having a snap latch thereon, a filter holder, a pin on the holder adapted to engage the snap latch, said pin and snap latch definitely defining a fixed relation between the filter and objective when the filter holder is latched on the objective.

12. In an optical equipment for cameras, the combination with an objective, a mount for the objective having a snap latch thereon, a guideway leading up to the snap latch, a filter holder, a projection on the holder adapted to move in the guideway and engage the snap latch, said filter holder being definitely positioned with respect to the objective by sliding said holder until the projection becomes engaged by the latch.

13. In optical equipment for cameras, the combination with an objective, a filter mount for the objective, a pin and slot connection between the filter mount and objective and means for latching said pin in said slot comprising a spring latch adapted to hold said pin in a fixed position in said slot.

14. In optical equipment for cameras, the combination with an objective, a movable diaphragm therefor, a filter holder adapted to slide on the objective, banded filter areas carried by the filter holder, cooperating parts on the filter holder and objective adapted to automatically adjust the movable diaphragm and locate the banded filter by sliding the filter holder on the objective.

15. In optical equipment for cameras, the combination with an objective mounted in a fixed position with respect to the film gate, of an adjustable diaphragm for the objective, a banded filter, a filter holder carrying the banded filter, said filter being adapted to slide on the objective, and cooperating parts on the filter and objective actuated by sliding the filter on the objective for simultaneously positioning the diaphragm and locating the filter bands with respect to the film gate.

16. In photographic apparatus, the combination of a support, a film gate carried by the support, an objective carried by the support, an adjustable diaphragm for the objective, a filter removably carried by said apparatus and having color areas and cooperating means on the filter and on the apparatus for definitely locating the filter areas with respect to the film gate and also operative to adjust the diaphragm as the filter is placed on the apparatus.

Signed at Rochester, New York, this 19th day of October, 1928.

DONALD H. STEWART.